United States Patent
Wilsey et al.

(10) Patent No.: US 7,282,691 B2
(45) Date of Patent: Oct. 16, 2007

(54) METHOD FOR DETERMINING WAVELENGTHS OF LIGHT INCIDENT ON A PHOTODETECTOR

(75) Inventors: Philip A. Wilsey, Cincinnati, OH (US); Fred R. Beyette, Jr., Cincinnati, OH (US); Christopher James Fearing, Cincinnati, OH (US)

(73) Assignee: Clifton Labs, Inc., Cincinnati, OH (US)

( * ) Notice: Subject to any disclaimer, the term of this patent is extended or adjusted under 35 U.S.C. 154(b) by 42 days.

(21) Appl. No.: 11/401,828

(22) Filed: Apr. 11, 2006

(65) Prior Publication Data
US 2006/0232767 A1    Oct. 19, 2006

Related U.S. Application Data

(60) Provisional application No. 60/670,741, filed on Apr. 13, 2005.

(51) Int. Cl.
*G01J 1/44* (2006.01)
*G01J 3/50* (2006.01)
*H01J 40/14* (2006.01)
*H01J 5/16* (2006.01)
*H03F 3/08* (2006.01)

(52) U.S. Cl. .................. 250/214 R; 250/226
(58) Field of Classification Search ........ 250/226, 250/214 R; 356/218, 402, 407, 425
See application file for complete search history.

(56) References Cited

U.S. PATENT DOCUMENTS 3,659,157 A * 4/1972 Nagasawa .............. 338/15

| | | |
|---|---|---|
| 6,232,602 B1 | 5/2001 | Kerr |
| 6,373,055 B1 | 4/2002 | Kerr |
| 6,806,469 B2 | 10/2004 | Kerr |
| 6,841,816 B2 | 1/2005 | Merrill et al. |
| 2004/0178463 A1 | 9/2004 | Merrill et al. |
| 2004/0178466 A1 | 9/2004 | Merrill et al. |
| 2005/0194653 A1 | 9/2005 | Hynecek et al. |

OTHER PUBLICATIONS

Findlater, K. M. et al.; "A CMOS Image Sensor with a Double-Junction Active Pixel"; IEEE Transactions on Electron Devices, vol. 50, No. 1; Jan. 2003; p. 32-42.

* cited by examiner

*Primary Examiner*—Georgia Epps
*Assistant Examiner*—Suezu Ellis
(74) *Attorney, Agent, or Firm*—Guerin & Rodriguez, LLP; William G. Guerin

(57) ABSTRACT

Described are a method and a photodetector system for determining a wavelength of light. A current generated in a photodetector in response to incident light is determined. The incident light is terminated and a decay current generated by the photodetector is determined. The wavelength of the light is determined according to the current, the decay current and a predetermined correspondence between the current and decay current as a function of wavelength and time. In one embodiment, the decay current is compared to reference decay currents to determine a matched reference decay current and the wavelength of the light is determined according to a wavelength associated with the matched reference decay current.

16 Claims, 4 Drawing Sheets

METHOD FOR DETERMINING WAVELENGTHS OF LIGHT INCIDENT ON A PHOTODETECTOR

RELATED APPLICATION

This application claims the benefit of the filing date of co-pending U.S. Provisional Application Ser. No. 60/670,741, filed Apr. 13, 2005, titled "A Direct Method to Compute Optical Wavelengths," the entirety of which provisional application is incorporated by reference herein.

FIELD OF THE INVENTION

The invention relates generally to the spectral characterization of light. More particularly, the invention relates to the determination of wavelength of light by examining the decay characteristics of a photodetector current after the light is no longer incident on a photodetector.

BACKGROUND OF THE INVENTION

Digital imaging systems typically utilize one or more sensors having an array of photodetectors. Each photodetector is associated with an image pixel. Color imagers generally employ photodetector arrays in which a color filter is fabricated over each photodetector. The wavelength range of each color filter varies according to the position of the photodetector in the array. For example, in imaging systems utilizing red-green-blue (RGB) color data, each photodetector has a red, green or blue filter so that only optical energy within the wavelength band passed by the filter is detected. FIG. 1 illustrates a Bayer filter pattern used in many conventional color cameras providing RGB image data. Each photodetector 14 in a group of pixels 10 generates a photocurrent responsive to the optical power incident on the photodetector and in the wavelength band of a corresponding color filter. Thus red photodetectors generate a photocurrent responsive to red light, green photodetectors generate photocurrent responsive to green light, and blue photodetectors generate photocurrent responsive to blue light. For example, a blue pixel 14 within the group of pixels 10 can only record an analog value for blue incident light. To produce an RGB value for the blue pixel 14, the blue value measured by the pixel is coupled with an average of the surrounding red values from adjacent red pixels and the average of the surrounding green values from adjacent green pixels.

Using multiple photodetectors in the image plane to generate an RGB value results in color artifacts and diminished color clarity. Image capture sensors have been developed which rely on the variation in the absorption coefficient of a sensor material as a function of wavelength. More specifically, the sensors are based on the variation in the penetration depth of light as a function of wavelength. For example, a detector structure has been developed in which three vertically stacked photodetectors are used to detect three colors. Each photodetector is fabricated with a certain thickness and doping concentration. The photodetector nearest the surface of the structure senses blue light, the photodetector in the middle of the stack senses green light, and the photodetector at the greatest depth from the surface senses red light. Optical filtering is employed to improve discrimination of the blue, green and red detection bands. Advantageously, each RGB pixel is defined by a single photodetector stack and, therefore, higher image quality is achieved; however, the sensor design is complex and optimized only for one set of wavelength bands. Moreover, such sensors require expensive manufacturing processes capable of fabricating tightly controlled layer thicknesses and doping concentrations necessary to achieve sensitivity to the three defined wavelength bands.

SUMMARY OF THE INVENTION

In one aspect, the invention features a method for determining a wavelength of light incident on a photodetector. A current generated in the photodetector in response to the light is determined and the light incident on the photodetector is terminated. For a plurality of times subsequent to the termination, a decay current generated by the photodetector is determined. The wavelength of the light is determined in response to the determined current, the determined decay current at the plurality of times and a predetermined correspondence between current generated in the photodetector and decay current as a function of wavelength and time.

In another aspect, the invention features a method for determining a wavelength of light incident on a semiconductor photodetector. The semiconductor photodetector is irradiated with light and the irradiation is terminated. A decay current generated by the semiconductor photodetector is determined for a plurality of times and compared to reference decay currents to determine a matched reference decay current. The wavelength of the light is determined according to a wavelength associated with the matched reference decay current.

In yet another aspect, the invention features a photodetector system for determining a wavelength of incident light. The photodetector system includes a photodetector, a shutter, a current sampling module and a wavelength discrimination module. The shutter is disposed proximate to the photodetector and is adapted for terminating light incident on the photodetector. The current sampling module is in communication with the photodetector to determine a decay current from the photodetector at a plurality of times. The wavelength discrimination module is in communication with the shutter and the current sampling module, and determines the wavelength of the incident light according to the decay current at the plurality of times and a predetermined correspondence between the decay current according to wavelength and time.

In still another aspect, the invention features a method for determining a wavelength of light incident on a plurality of photodetectors configured in a vertical stack. A current generated in each photodetector in response to the light is determined. The light incident on the plurality of photodetectors is terminated and, for a plurality of times subsequent to the termination, a decay current generated by each photodetector is determined. The wavelength of the light is determined according to the currents, the decay currents at the plurality of times and a predetermined correspondence between the currents generated in the photodetectors and the decay currents as a function of wavelength and time.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Figure 1:
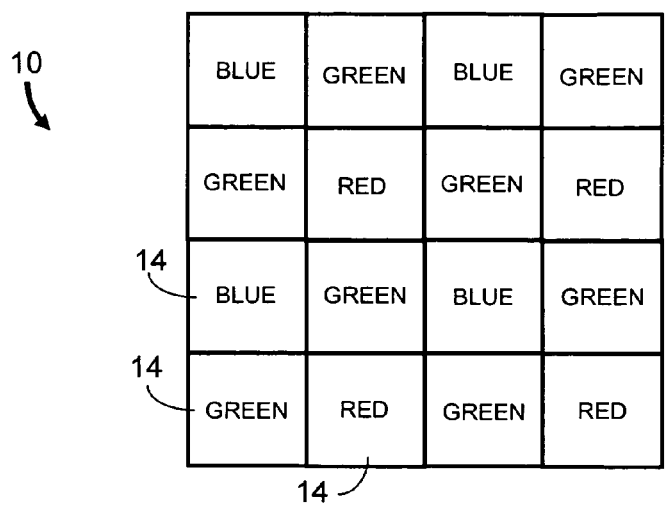
FIG. 1 illustrates a Bayer color filter pattern used in conventional color cameras to generate RGB image data.

In brief overview, the present invention relates to a method and a photodetector system for determining wavelength and optical power of an optical signal. The method is based on measuring a decay current (i.e., residual current) from a photodetector at fixed times after the light is blocked and determining one or more wavelengths (or wavelength bands) of the light according to a predetermined correspondence between the decay current and wavelength. The photodetector can be fabricated in a variety of optically active materials. For example, the photodetector can be fabricated using standard VLSI techniques because strict control of photodetector layer thicknesses and doping concentrations is not required. The photodetector system provides true wavelength responsivity over a wide spectral range. Signal processing circuitry enables both wavelength and optical power to be sensed by each photodetector element in a detector array. Although described below primarily as a silicon semiconductor device which limits the spectral range to visible and near infrared (IR) wavelengths, other implementations employ other column IV materials, III-V materials, II-VI materials, and combinations of these materials such that wavelength sensitivity can be tailored to cover a wide range of operating wavelengths extending from ultraviolet (UV) wavelengths to the long-IR wavelengths.

Optical filters are not required to enable the determination of wavelength. A single photodetector provides all the information necessary to determine the wavelength of the incident light. Thus averaging among a group of pixels in not necessary to determine color information for a single pixel. Consequently, arrays of photodetectors according to the invention yield improved image quality over conventional imaging arrays.

Operation at wavelengths outside the spectral sensitivity of a detector array using one material (e.g., silicon) can be achieved using a separate photodetector array connected to external signal processing circuitry. Alternatively, higher frame rates can be achieved for a given material using a second photodetector array with separate signal processing circuitry. The elimination of external filters, cooling systems, and multiple sensors for different spectral bands results in improved reliability, lower cost, and high performance calorimetric imaging in small imagers These photodetectors enable many of the benefits of multispectral technology without complex architectures relying on spectrometers, multi-channel electronics and high bandwidth communication links.

If a photodetector is irradiated with light at normal incidence and an optical power $P_{In}$ the number of photons per second N incident on the photodetector surface is given by $$N = \frac{P_{In}}{E_{photon}} = \frac{P_{In}\lambda}{hc} \quad (1)$$

where $E_{photon}$ is the photon energy, $\lambda$ is the wavelength of the photons, h is Planck's constant, and c is the speed of light in a vacuum. To absorb the incident photons and convert them to current, the photon energy $E_{photon}$ must be greater than the band-gap energy $E_g$ of the semiconductor. Thus the following relationship must be satisfied for photon absorption to occur:

$$\frac{hc}{\lambda} > E_g \quad (2)$$

Figure 2:
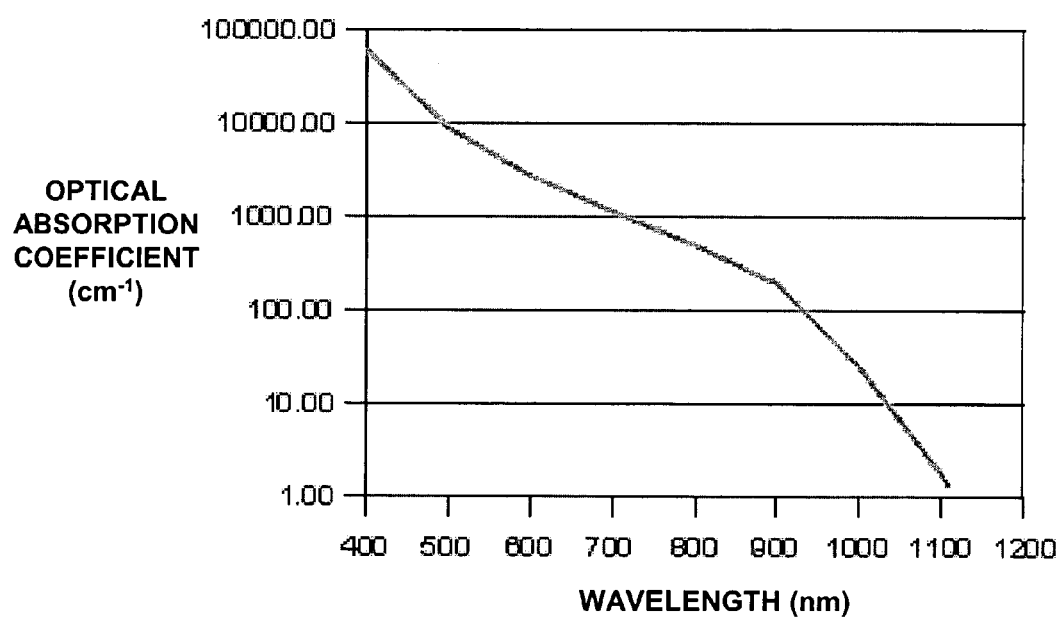
FIG. 2 is a graphical representation of the optical absorption coefficient of silicon as a function of wavelength.
Figure 3:
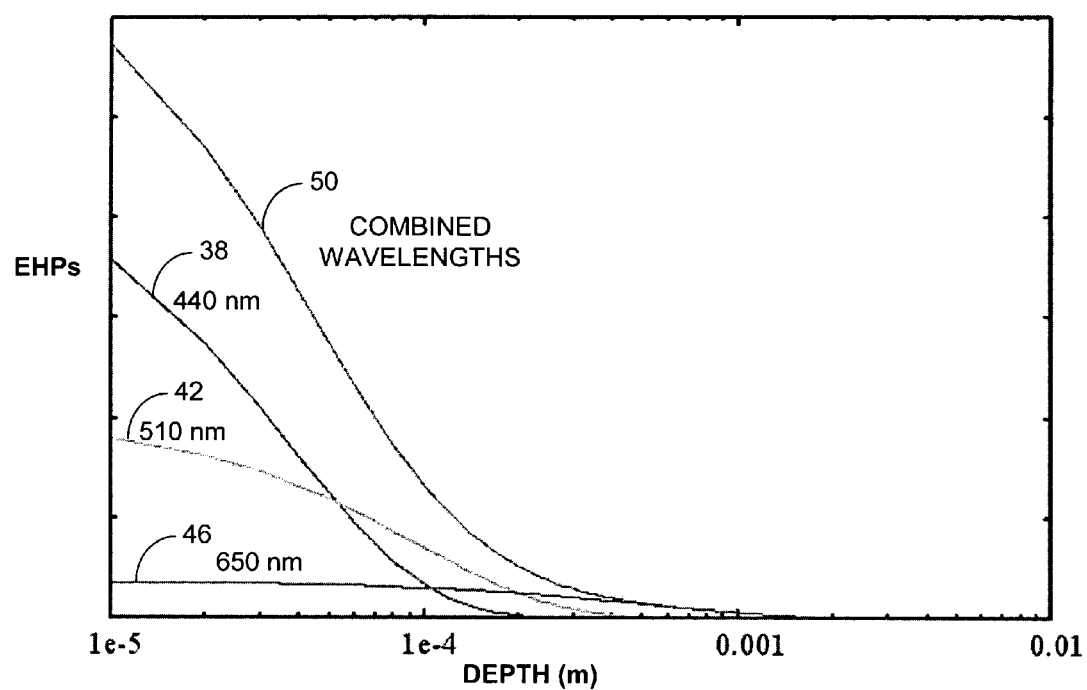
FIG. 3 is a graphical representation of the distribution of generated electron-hole pairs as a function of silicon substrate depth for various wavelengths.

Each absorbed photon creates a single electron-hole pair (EHP). The creation of EHPs does not occur at a single depth in the semiconductor. Instead, there is a wavelength dependent exponential distribution of optically-generated EHPs that corresponds to the penetration of the light in the semiconductor. More specifically, the exponential distribution varies by wavelength such that longer wavelengths have a deeper average penetration depth. The optical absorption coefficient $\alpha$ for the distribution in silicon according to wavelength is depicted in FIG. 2. Thus, the number of photons per second N passing through a plane that is parallel to the semiconductor surface and located at a depth x is given by $$N(x) = N_0 e^{(-\alpha * x)} \quad (3)$$

where $N_0$ is the number of photons per second incident on the surface of the photodetector and $\alpha$ is the wavelength dependent absorption coefficient. If every absorbed photon is converted into an EHP, equation (3) also defines the distribution of optically generated EHPs in the semiconductor. FIG. 3 illustrates the distribution of the generated EHPs according to wavelength. Lines 38, 42 and 46 represent distributions for 440 nm, 510 nm and 650 nm wavelengths, respectively. Line 50 represents a distribution of the EHPs resulting from a combination of equal numbers of photons at each of the three wavelengths. The "shape" of the combination distribution 50 is significantly different from the other distributions 38, 42, 46.

Analysis of the distribution of EHPs yields a spectral characterization of the light incident on the photodetector. More specifically, the number of photons per second N incident on the photodetector is determined by integration over depth and wavelength as:

$$N = \int_{minimum\ material\ wavelength}^{maximum\ material\ wavelengths} \left( \int_a^b (N_0 e^{(-\alpha * x)} dx) d\alpha_\lambda \right) \quad (4)$$

where a and b are the minimum and maximum depths, respectively, defining a specific region of the semiconductor material, and minimum material wavelength and maximum material wavelength describe lower and upper spectral wavelength limits, respectively, for EHP generation caused by the incident light in the semiconductor material.

The photodetector collects the EHPs and generates an electric current proportional to the rate of EHP collection. A reverse bias voltage applied to the PN junction produces an electrical field that collects all of the optically generated EHPs within a minority carrier diffusion length of the field region. The collected EHPs make up the photocurrent $I_{op}$ which is given by:

$$I_{op} = qAG_{op}t_{Active} \quad (5)$$

where q is the charge of an electron, A is the area of the photodetector, Gop is the generation rate of EHPs per unit volume, and $t_{Active}$ is the thickness of the region where EHP collection occurs. The product $A\, t_{Active}$ defines the volume from which optically generated EHPs are collected to produce the photodetector current. Thus the current $I_{op}$ is given by:

$$I_{op} = qN_{abs} \quad (6)$$

where $N_{abs}$ is the number of photons per second absorbed in the collection volume. $N_{abs}$ can be calculated using Equation (3) by subtracting the photon rate at the bottom of the collection volume $N(x=x_{Bottom})$ from the photon concentration at the top of the collection volume, $N(x=x_{Top})$.

The method for determining a wavelength of light incident on a semiconductor photodetector according to the invention is based on measuring the decay of the photodetector current after light incident on the photodetector is blocked or otherwise terminated. While a light of constant optical power is present, the photodetector current is constant and is proportional to the incident optical power. Subsequently when the light is prevented from irradiating the photodetector, the earlier generated EHPs still present in the photodetector continue to move toward the device junctions. As absorption depths vary according to wavelength, the time and manner in which the current decays from a constant value to zero varies according to wavelength and optical power. The time-dependent photodetector current I(t) is given by:

$$I(t) = qN_0 * (e^{(-\alpha * x_{Top})} - e^{(-\alpha * x_{Bottom})}) e^{(-\alpha * vt)} \quad (7)$$

where $x_{Bottom}$ and $x_{Top}$ are the depths into the substrate for the bottom and top junctions, respectively, v is the diffusion velocity and t is the time after the light is terminated.

As indicated in FIG. 3, most of the shorter wavelength photons are absorbed close to the photodetector surface. Thus, nearly all the EHPs are created near the junctions, and the time until the current decays to substantially zero is small. Longer wavelengths penetrate deeper and generate EHPs in a larger volume. Consequently, EHPs generated by light at longer wavelengths take longer to travel to the junction, resulting in a longer decay time.

Figure 4:
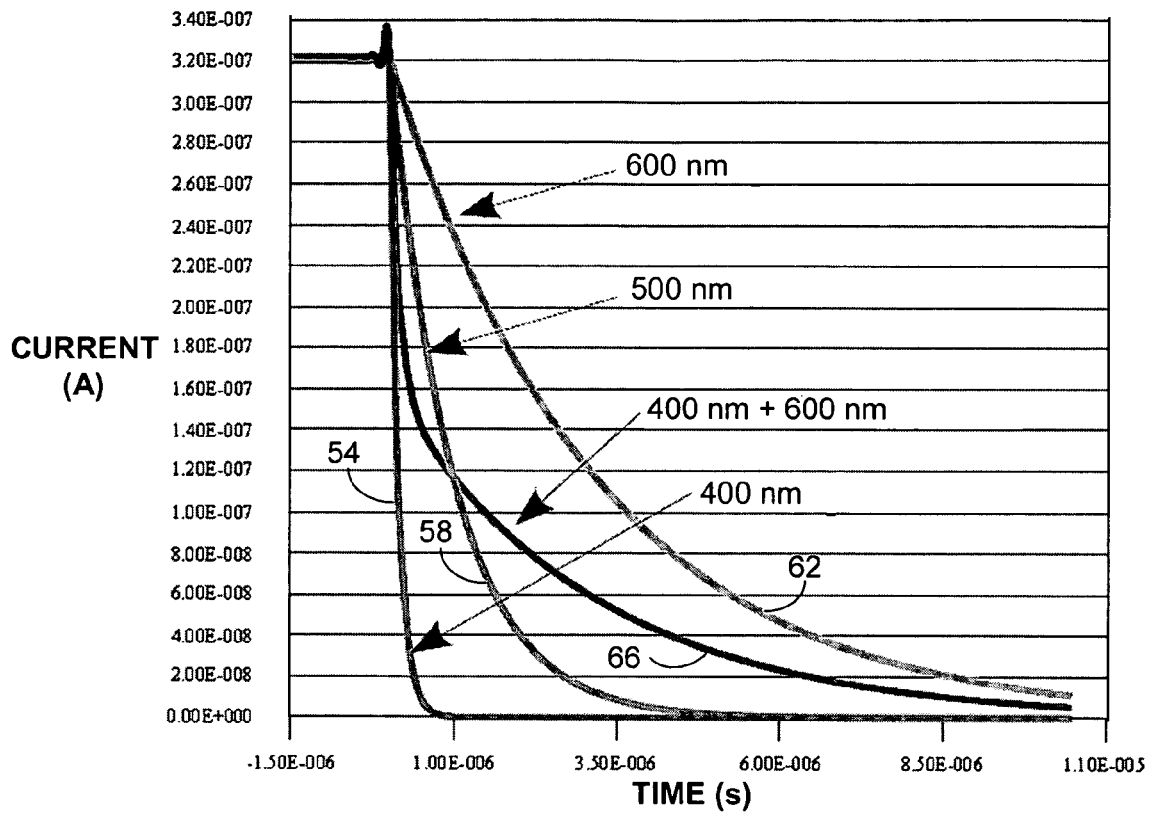
FIG. 4 is a graphical representation of photodetector current as a function of time for light of certain wavelengths.

FIG. 4 graphically illustrates the decay of the photodetector current for light of different wavelengths. Decay current characteristics indicated by lines 54, 58 and 62 represent single wavelength light at 400 nm, 500 nm and 600 nm, respectively. Incident light having a combination of wavelengths of 400 nm and 600 nm is represented by line 66. The optical powers for each wavelength are equal. Although the "average" wavelength of the combined wavelength light is 500 nm, the corresponding decay current characteristic 66 is distinct from the decay current characteristic 58 for single wavelength light at 500 nm.

Figure 5:
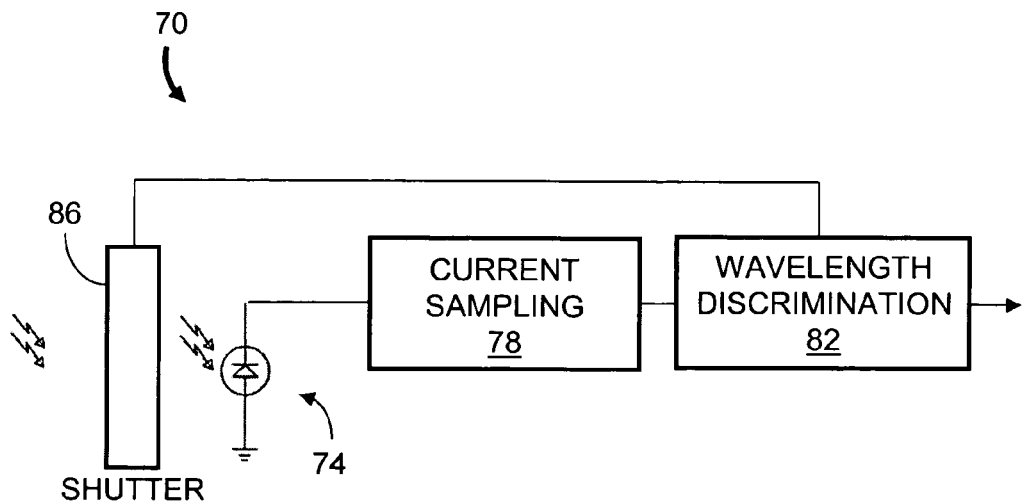
FIG. 5 is a diagram of an embodiment of a photodetector system for determining a wavelength of incident light in accordance with the invention.

Referring to FIG. 5, a photodetector system 70 according to an embodiment of the invention includes a semiconductor photodetector 74 in communication with a current sampling module 78. A wavelength discrimination module 82 communicates with the current sampling module 78 and a shutter 86. In one embodiment, the shutter 86 is a mechanical shutter that can be switched between a transparent and a blocking (e.g., opaque) state in response to a control signal from the wavelength discrimination module 82. In other embodiments, the shutter 86 is an electro-optic shutter that can change quickly between blocking and transparent states according to the control signal.

In operation, the shutter 86 is in a transparent state to allow the light to be analyzed to irradiate the photodetector 74. The wavelength discrimination module 82 asserts a control signal to cause the shutter 86 to switch to a blocking state. After the light is blocked, the decay current supplied by the photodetector 74 is sampled a number of times. For example, sampling can utilize capacitors either as discrete elements or as gate capacitances. Multiple current samples can be acquired independently at different sample times or samples can be acquired in a serial fashion. In some embodiments, the wavelength discrimination module 82 interpolates the sampled current data to generate a characteristic decay current function for comparison with reference decay current data. The reference decay current data can be obtained, for example, by calibrating the photodetector system 70 with light of known wavelengths and known combinations of wavelengths to obtain corresponding decay currents as a function of time. The wavelength or wavelengths of the incident light are determined from the reference data best matched to the measured decay current function from each. For example, for a three color photodetector array for a digital camera based on the photodetector systems of the invention, the measured decay current function of each pixel is compared to the reference decay current data to determine the best match and corresponding wavelengths. Alternatively, more complex interpolation methods can be used to generate models for the decay current data as a function of wavelength and wavelength combinations.

In another embodiment of a photodetector system according to the invention, the semiconductor photodetector includes at least two photodetectors vertically stacked so that a portion of the incident light is absorbed in two or more photodetectors. The decay current from each photodetector is sampled and is compared with reference data as described above to more accurately determine the wavelength or combination of wavelengths of the light.

Various forms of electronic circuits for accurately capturing the salient features of the current decay characteristics can be utilized by the current sampling module 78. In one embodiment, multiple capacitors are used with each capacitor having a different sampling time or measuring time for the current to reach a threshold value.

Figure 6:
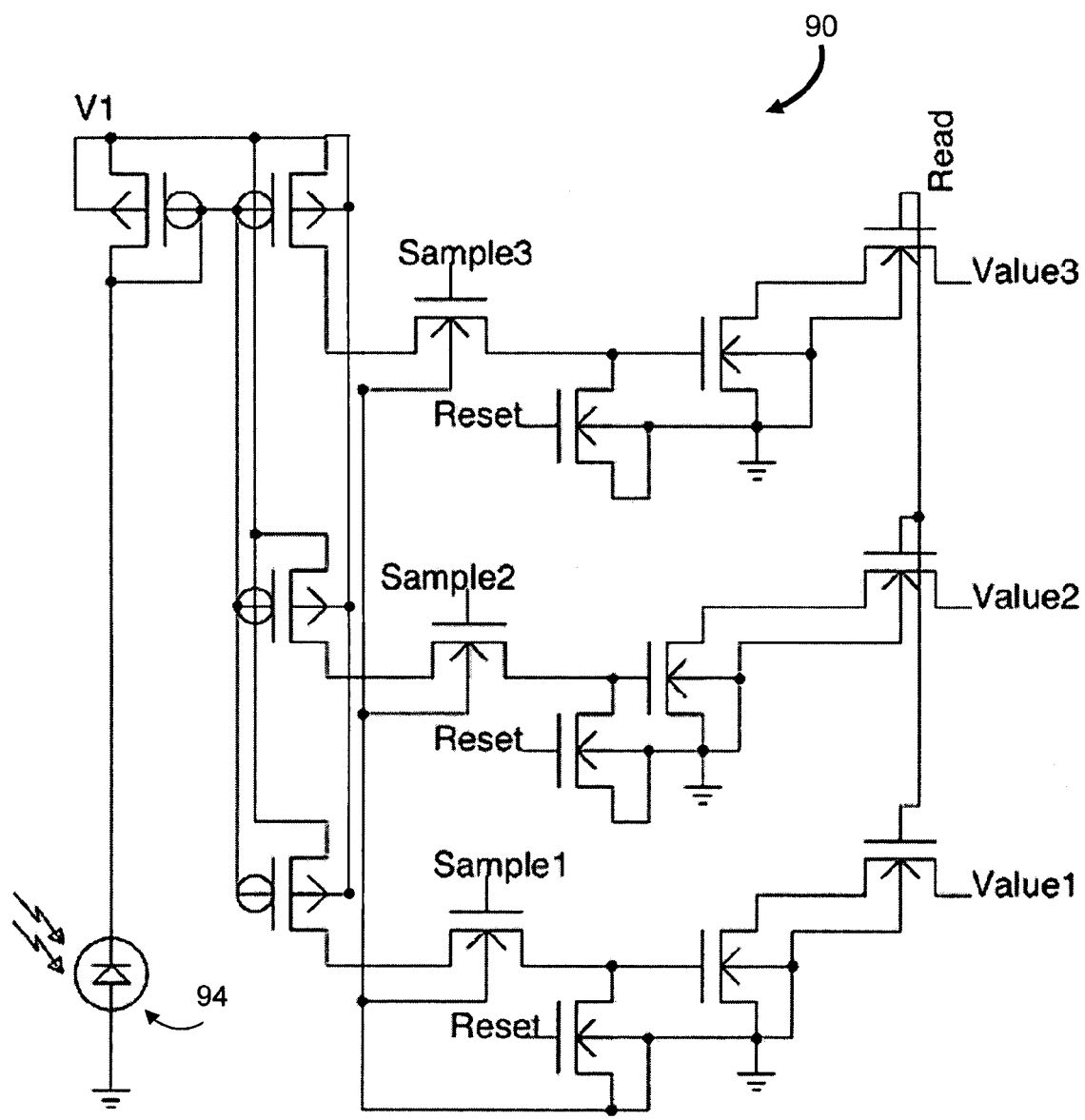
FIG. 6 is a diagram of a circuit for acquiring three samples of a decay current at different times in accordance with an embodiment of the invention.

FIG. 6 is a diagram of a circuit 90 for acquiring three samples of the decay current at different times. The circuit 90 includes a single photodetector 94 which generates a current flowing to ground in response to incident light. The circuit 90 also includes PMOS and NMOS devices, and includes a current mirror configuration to provide three "mirrored" currents so that each mirrored current can be independently sampled at a distinct time. The three constant value analog currents VALUE1, VALUE2 and VALUE3 result from sampling at different times according to sampling control signals SAMPLE1, SAMPLE2 and SAMPLE3, respectively, and are available when a read signal READ is asserted. For example, one sampling control signal SAMPLE1 can be asserted first at a time soon after the light is shuttered so that the measured current VALUE1 includes contributions from EHPs generated from all wavelengths in the incident light. Sampling control signals SAMPLE2 and SAMPLE3 are asserted at later times during the current decay. Other circuits are contemplated according to the invention in which greater numbers of decay current samples are acquired, leading to more accurate determinations of wavelength.

While the invention has been shown and described with reference to specific embodiments, it should be understood by those skilled in the art that various changes in form and detail may be made therein without departing from the spirit and scope of the invention.

What is claimed is:

1. A method for determining a wavelength of light incident on a photodetector, the method comprising:
    determining a current generated in the photodetector in response to the light;
    terminating the light incident on the photodetector;
    determining, for a plurality of times subsequent to the termination, a decay current generated by the photodetector; and
    determining the wavelength of the light in response to the determined current, the determined decay current at the plurality of times and a predetermined correspondence between current generated in the photodetector and decay current as a function of wavelength and time.

2. The method of claim 1 wherein the photodetector is fabricated in a semiconductor material.

3. The method of claim 1 wherein terminating the light comprises activating a shutter to prevent the light from irradiating the photodetector.

4. A photodetector system for determining a wavelength of incident light, comprising:
    means for determining a current generated in the photodetector in response to incident light;
    means for terminating the incident light;
    means for determining, for a plurality of times subsequent to the termination, a decay current generated by the photodetector; and
    means for determining the wavelength of the incident light in response to the determined current, the determined decay current at the plurality of times and a predetermined correspondence between current generated in the photodetector and decay current as a function of wavelength and time.

5. A method for determining a wavelength of light incident on a semiconductor photodetector, the method comprising:
    irradiating the semiconductor photodetector with light;
    terminating the irradiation of the semiconductor photodetector;
    determining a decay current generated by the semiconductor photodetector for a plurality of times;
    comparing the decay current for the plurality of times to reference decay currents to determine a matched reference decay current; and
    determining the wavelength of the light in response to a wavelength associated with the matched reference decay current.

6. The method of claim 5 wherein at least a portion of the reference decay current data is obtained from calibration of the semiconductor photodetector with light of known wavelengths.

7. The method of claim 5 wherein at least a portion of the reference decay current data is obtained from calibration of the semiconductor photodetector with light of known combinations of wavelengths.

8. The method of claim 5 wherein the wavelength of light comprises a wavelength band.

9. The method of claim 5 wherein the wavelength of light comprises a plurality of wavelengths.

10. The method of claim 9 wherein each wavelength comprises a wavelength band.

11. The method of claim 5 wherein determining a decay current comprises:
    measuring a decay current generated by the semiconductor photodetector for a plurality of times; and
    interpolating the measured decay current to determine the decay current.

12. A photodetector system for determining a wavelength of incident light, comprising:
    a photodetector;
    a shutter disposed proximate to the photodetector and adapted for terminating light incident on the photodetector;
    a current sampling module in communication with the photodetector to determine a decay current from the photodetector at a plurality of times; and
    a wavelength discrimination module in communication with the shutter and the current sampling module to determine the wavelength of the incident light in response to the decay current at the plurality of times and a predetermined correspondence between the decay current according to wavelength and time.

13. The photodetector system of claim 12 wherein the shutter comprises an electronic shutter.

14. The photodetector system of claim 12 wherein the shutter comprises a mechanical shutter.

15. The photodetector system of claim 12 wherein the current sampling module comprises a circuit having a plurality of current mirrors each adapted for providing a current proportional to the decay current at a unique sample time.

16. A method for determining a wavelength of light incident on a plurality of photodetectors configured in a vertical stack, the method comprising:
    determining a current generated in each photodetector in response to the light;
    terminating the light incident on the plurality of photodetectors;
    determining, for a plurality of times subsequent to the termination, a decay current generated by each photodetector; and
    determining the wavelength of the light in response to the determined currents, the determined decay currents at the plurality of times and a predetermined correspondence between the currents generated in the photodetectors and the decay currents as a function of wavelength and time.

* * * * *